United States Patent
Markley

(10) Patent No.: US 9,080,640 B2
(45) Date of Patent: *Jul. 14, 2015

(54) MULTI-STRAND TENSIONING ARRANGEMENT WITH MOVING ARMS

(75) Inventor: George L. Markley, Montour Falls, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 484 days.

This patent is subject to a terminal disclaimer.

(21) Appl. No.: 13/505,776

(22) PCT Filed: Oct. 29, 2010

(86) PCT No.: PCT/US2010/054635
§ 371 (c)(1),
(2), (4) Date: May 3, 2012

(87) PCT Pub. No.: WO2011/056719
PCT Pub. Date: May 12, 2011

(65) Prior Publication Data
US 2012/0225744 A1 Sep. 6, 2012

Related U.S. Application Data

(60) Provisional application No. 61/257,779, filed on Nov. 3, 2009, provisional application No. 61/323,710, filed on Apr. 13, 2010.

(51) Int. Cl.
*F16H 7/08* (2006.01)

(52) U.S. Cl.
CPC .......... *F16H 7/08* (2013.01); *F16H 2007/0806* (2013.01); *F16H 2007/0812* (2013.01); *F16H 2007/0874* (2013.01); *F16H 2007/0893* (2013.01)

(58) Field of Classification Search
CPC .............. F16H 7/08; F16H 2007/0806; F16H 2007/0808; F16H 2007/0812; F16H 2007/0872; F16H 2007/0874; F16H 2007/0893
USPC .................................. 474/101, 110, 111, 140
See application file for complete search history.

(56) References Cited

U.S. PATENT DOCUMENTS 2,129,107 A 9/1938 Taylor
2,210,276 A 8/1940 Bremer
(Continued)

FOREIGN PATENT DOCUMENTS

FR 2832358 A1 2/2004
JP 08-135463 A 5/1996
(Continued)

OTHER PUBLICATIONS

PCT/US2010/054635 International Search Report.

*Primary Examiner* — Sang Kim
*Assistant Examiner* — Juan Campos, Jr.
(74) *Attorney, Agent, or Firm* — Helmholdt Law PLC; Thomas D. Helmholdt

(57) ABSTRACT

An apparatus (10) for imparting tension to multiple strands of an endless power transferring member loop (12) encircling a drive sprocket (14) and at least one driven sprocket (16a, 16b). Two tensioning arms (18a, 18b) are spaced apart and have guided movement relative to at least one fixed pin (26), and support inwardly facing shoes (20a, 20b) with power-transferring-member-sliding faces (22a, 22b). A link assembly (60) includes at least two link members (32a, 32b) pivotally connected to one another at respective first ends (40a, 40b). The connected first ends (40a, 40b) are constrained for limited movement along a fixed slot (36) extending generally along a centerline of the power transferring member loop (12) between the drive sprocket (14) and the driven sprockets (16a, 16b). The link members (32a, 32b) are pivotally connected individually to opposite ends of the two spaced apart tensioning arms (18a, 18b) at second locations (42a, 42b).

19 Claims, 6 Drawing Sheets

(56) References Cited

U.S. PATENT DOCUMENTS

| | | |
|---|---|---|
| 3,856,101 A | 12/1974 | Allison |
| 5,967,922 A | 10/1999 | Ullein et al. |
| 6,322,470 B1 | 11/2001 | Markley et al. |
| 6,358,169 B1 | 3/2002 | Markley |
| 6,849,015 B2 | 2/2005 | Markley et al. |
| 6,955,621 B2 | 10/2005 | Wigsten et al. |
| 7,097,579 B2 | 8/2006 | Markley |
| 7,390,276 B2 * | 6/2008 | Tryphonos .................... 474/109 |
| 7,429,226 B2 * | 9/2008 | Tryphonos .................... 474/111 |
| 7,476,168 B2 | 1/2009 | Markley et al. |
| 2006/0270502 A1 * | 11/2006 | Markley et al. ................ 474/111 |
| 2009/0264232 A1 | 10/2009 | Bauer et al. |
| 2009/0325749 A1 | 12/2009 | Wigsten |
| 2009/0325750 A1 | 12/2009 | Wigsten et al. |
| 2013/0023367 A1 * | 1/2013 | Markley ........................ 474/111 |
| 2013/0059687 A1 * | 3/2013 | Markley ........................ 474/111 |

FOREIGN PATENT DOCUMENTS

| | | |
|---|---|---|
| JP | 2002-089636 A | 3/2002 |
| JP | 2004-116428 A | 4/2004 |

* cited by examiner

MULTI-STRAND TENSIONING ARRANGEMENT WITH MOVING ARMS

FIELD OF THE INVENTION

The invention relates to a tensioning system for imparting tension to a power transferring member or chain encircling a driving sprocket and at least one driven sprocket, and more particularly, to a tensioner that simultaneously tensions multiple strands of the power transferring member or chain.

BACKGROUND

Chain tensioners in engines are used to control the power transmission chains as the chain travels around a plurality of sprockets. The slack of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner for example, in an engine with a chain driven camshaft, the engine may be damaged because the camshaft timing is misaligned by several degrees due to slippage or tooth jumping.

Various configurations for closed loop chain tensioner systems are known from U.S. Pat. No. 7,476,168: U.S. Pat. No. 7,429,226; U.S. Pat. No. 6,955,621; U.S. Pat. No. 6,322,470; U.S. Pat. No. 3,856,101; U.S. Pat. No. 2,210,276; French Patent No. 2,832,358; and Japanese Patent No. 2002-089, 636. While each of these configurations is satisfactory for performing its intended function, several of these configurations provide restricted space and location sites for the tensioner driver. It would be desirable to provide a tensioning system that overcomes these limitations, and that provides additional benefits as described below.

SUMMARY

A tensioning system imparts tension to an endless loop power transferring member encircling a drive sprocket and at least one driven sprocket. The system includes a pair of tensioning arms, a pair of link members, a centrally located slot body, and a tension driver mechanism. Each of the pair of tensioning arms can have an end for guided movement relative to at least one fixed pin, a link end, and a shoe with a sliding face for tensioning a power transferring member. The slot body can be rigidly fixed to secure the slot body with outer ends of the slot pointing generally toward the sprockets and somewhat central to and inside the power transferring member. In combination with the slot body configuration, a free moving pin can be retained in the slot, and pivotally constrained to the first end of the pair of link members, restricting the movement of the first ends of both link members to that defined by the slot. The link end of the second tensioning arm is pivotally attached to a second end of one link member.

The guided movement end of both arms can be attached to either a common fixed pivot pin, separate fixed pivot pins, or a pin and slot combination lost motion assembly, all generically referred to herein as guided arm movement mechanisms. The link end of the first tensioning aim is pivotally attached to the other link member. In one configuration, one of the link members can include a lever extension, sometimes referred to herein as an elongate link member. The lever extension can extend outwardly from either the pivotal attachment of one of the link members to a pivoting arm by a distance nearly equidistant in relation to a distance from the first end of the link member to the pivotal attachment, or the pivotal attachment of one of the link members to free moving pin within the slot of the slot body by a distance nearly equidistant in relation to a distance from the first end of the link member to pivot attachment.

The tension driver mechanism can have a rigidly fixed housing for receiving an outwardly spring biased piston. An end of the piston can be in direct or indirect contact with one of the pivoting tensioning arms for applying force and pivoting movement to the tensioning arm, where the link members transfer motion from one tensioning arm to the other. In the configuration with an elongate link member, an end of the piston can be in contact with a pad near an end of the lever extension of the elongate link member. When the piston of the tension driver mechanism is biased outwards from the housing, the end of the piston applies force to the pad and a pivoting moment at the link end of the first tensioning arm, forcing the first link end of the elongate link member with a lever extension to move within the slot of the slot body while moving the second tensioning arm toward the power transferring member centerline in a tensioning manner. Being that the first end of the link member is pivotally attached to the elongate link member with a lever extension, the at least one link member also must move in the slot and move the second tensioning arm toward the power transferring member centerline, thereby tensioning the power transferring member nearly simultaneously and nearly equally on both strands. The power transferring member, the sprockets, the tension driver mechanism and the spring loading of the tensioning arm shoe can be of any conventional configuration.

Other applications will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The term "belt" or "chain", as used interchangeably herein, is any power transferring member forming an endless loop and constructed of flexible material or of articulated rigid links to permit the member to conform to a radius of curvature of a pulley or sprocket drive face and intended, in use, to be driven in an endless path; and, by contact with the pulley or sprocket drive face, to transmit power to or extract power from the pulley or sprocket. The term a "pulley" or "sprocket", as used interchangeably herein, is a device rotatable about an axis and having a drive face radially spaced from the axis of rotation for intended power transferring engagement with a belt or chain to drive the belt or chain on an endless path or to extract power from the belt or chain to drive an output load device. The term "guide roll" as used herein is a device rotatable about an axis and having a belt or chain-contacting face radially spaced from the axis of rotation for intended engagement with the belt or chain to aid in directing the belt or chain along an intended path of travel. A guide roll, as distinguished from a pulley or sprocket, is not intended to provide driving power to, or extract power from, a belt or chain. The term "tensioning arm" as used herein is a member other than a pulley or sprocket engageable with a belt or chain, and which is adjustable or relatively movable with respect to the belt or chain in a direction which causes an increase or decrease in tensile stress in the belt or chain or a take-up or any undesirable belt or chain slack to maintain a desirable drive traction between the belt or chain and the pulley or sprocket drive face. A tensioning arm, as distinguished from a guide roll, has a non-rotatable face portion for contacting the belt or chain, whereby the belt or chain slides over the face portion of the tensioning arm. The term "tension drive mechanism" as used herein applies a force for actuating the multi-strand tensioning arrangement and is derived from or transmitted via mechanical energy, electrical energy, or the exertion of force on a fluid.

Figure 1:
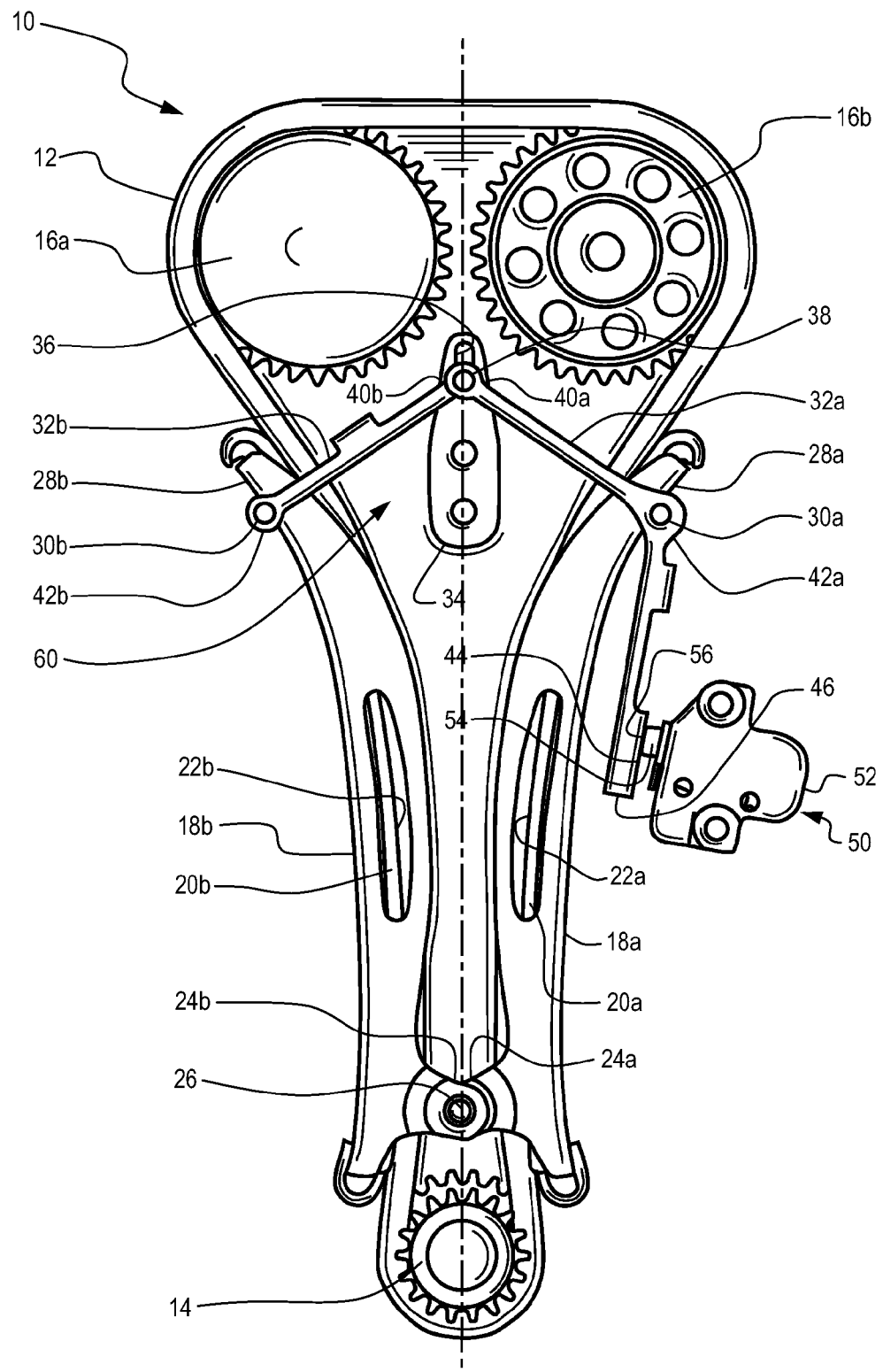
FIG. 1 is a front view of a timing system including a multi-strand tensioning arrangement having an endless loop of belt or chain, a drive sprocket, at least one driven sprocket, a tension driver mechanism acting on a lever extension of a link member, and an arm movement guide mechanism including a single fixed pivot pin configuration.
Figure 2:
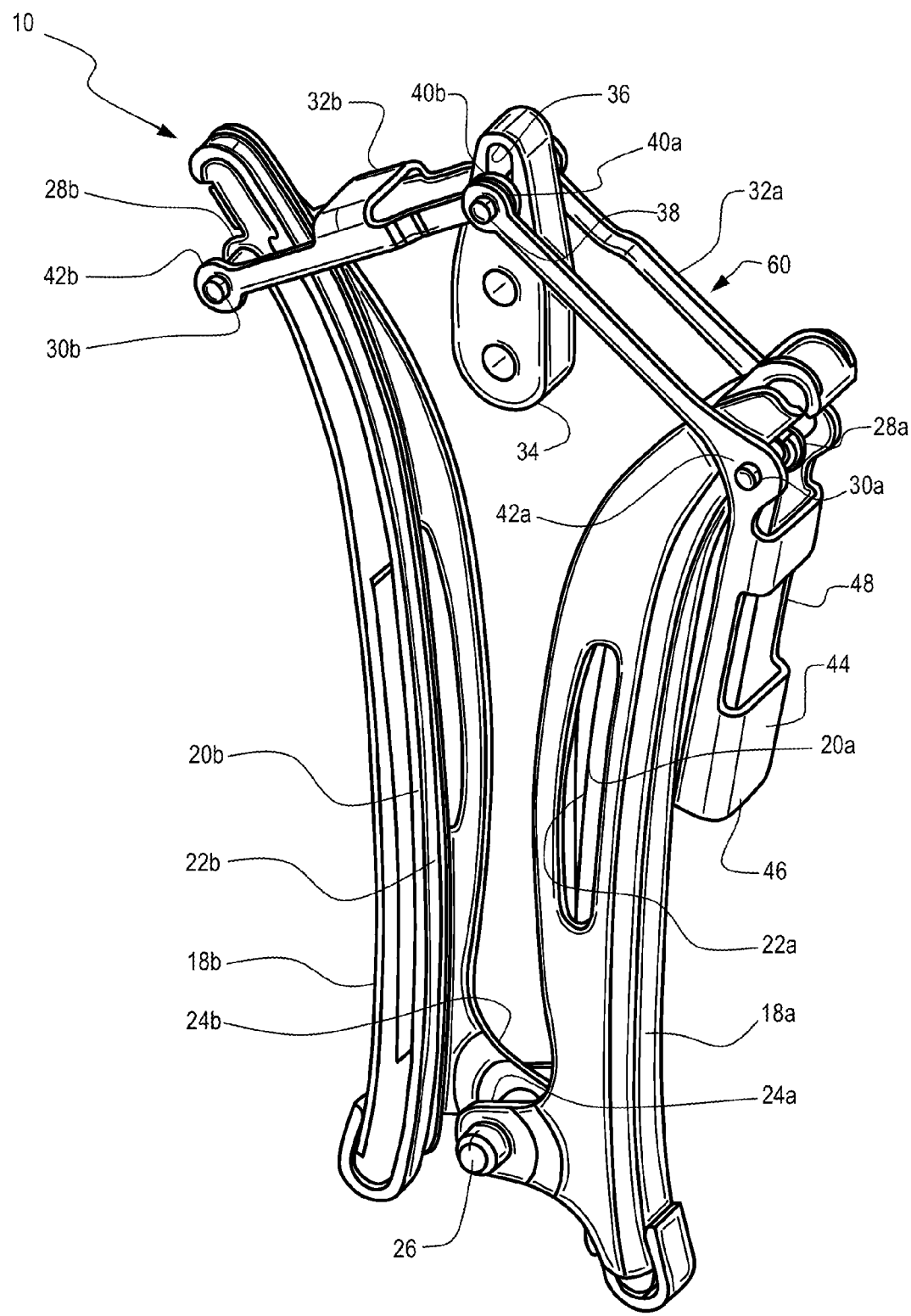
FIG. 2 is a perspective or isometric view of the multi-strand tensioning arrangement of FIG. 1 with the endless loop of belt or chain, the drive sprocket, the at least one driven sprocket, and the tension driver mechanism removed for clarity, and one of the tensioning arms sectioned to show only the back half.

FIGS. 1-2 illustrate a multi-strand tensioning arrangement or apparatus 10 including an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of so both the taut strand and the slack strand of the power transferring member 12 are tensioning arms 18a, 18b. Each of the tensioning arms 18a, 18b can have a compliant face assembly including a wrap around shoe 20a, 20b with a power-transferring-member-sliding surface 22a, 22b extending along a significant length of the arm. Each shoe 20a, 20b can be spring loaded with a blade type spring positioned within a pocket of the complaint face assembly, if desired. The spring can be located between the tensioning arm 18a, 18b and the corresponding shoe 20a, 20b deforming the shoe away from the tensioning arm.

Figure 3:
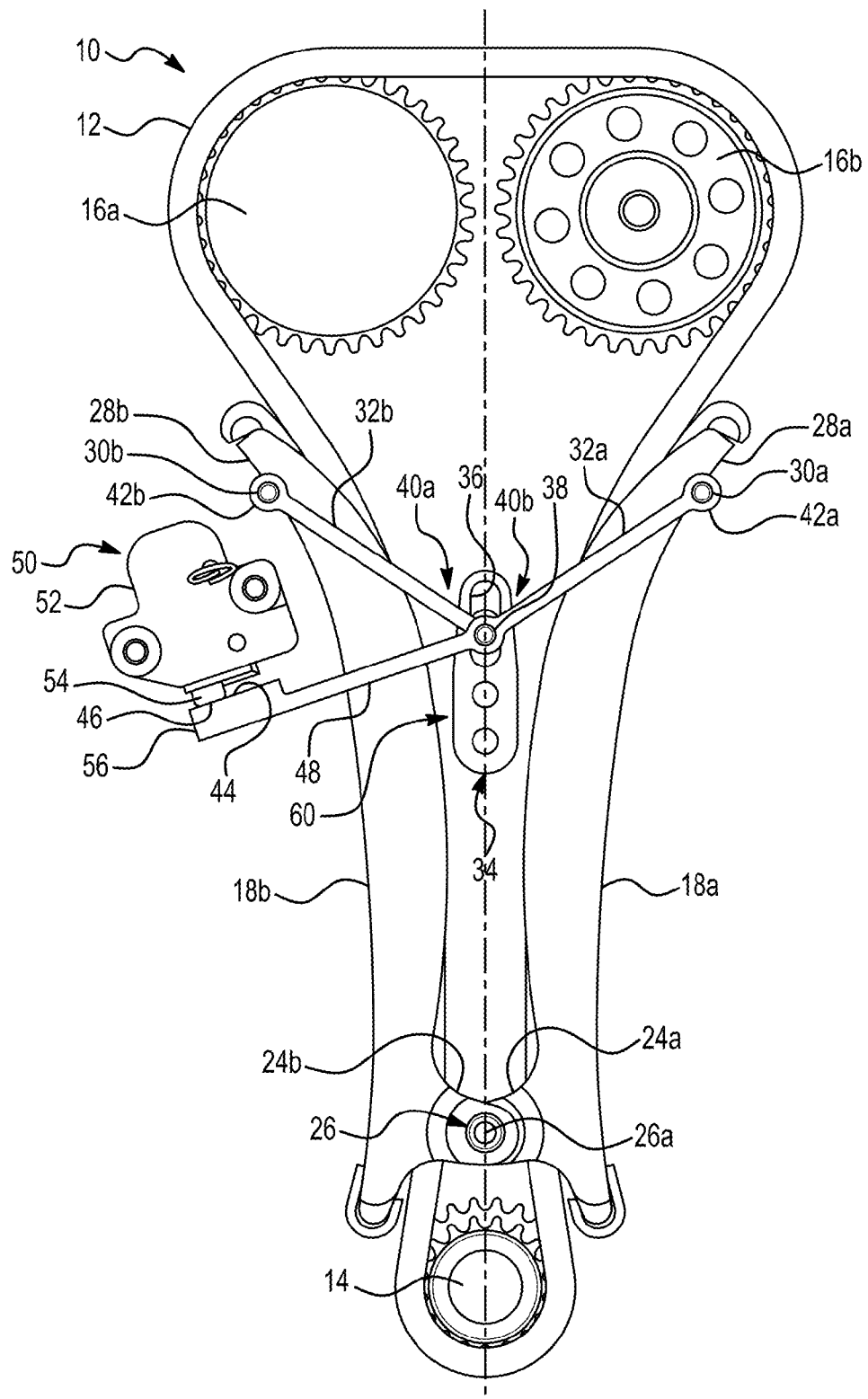
FIG. 3 is a front view of a timing system including a multi-strand tensioning arrangement having an endless loop of belt or chain, a drive sprocket, at least one driven sprocket, a tension driver mechanism acting on a lever extension of a link member, and an arm movement guide mechanism including a single fixed pivot pin configuration.
Figure 4:
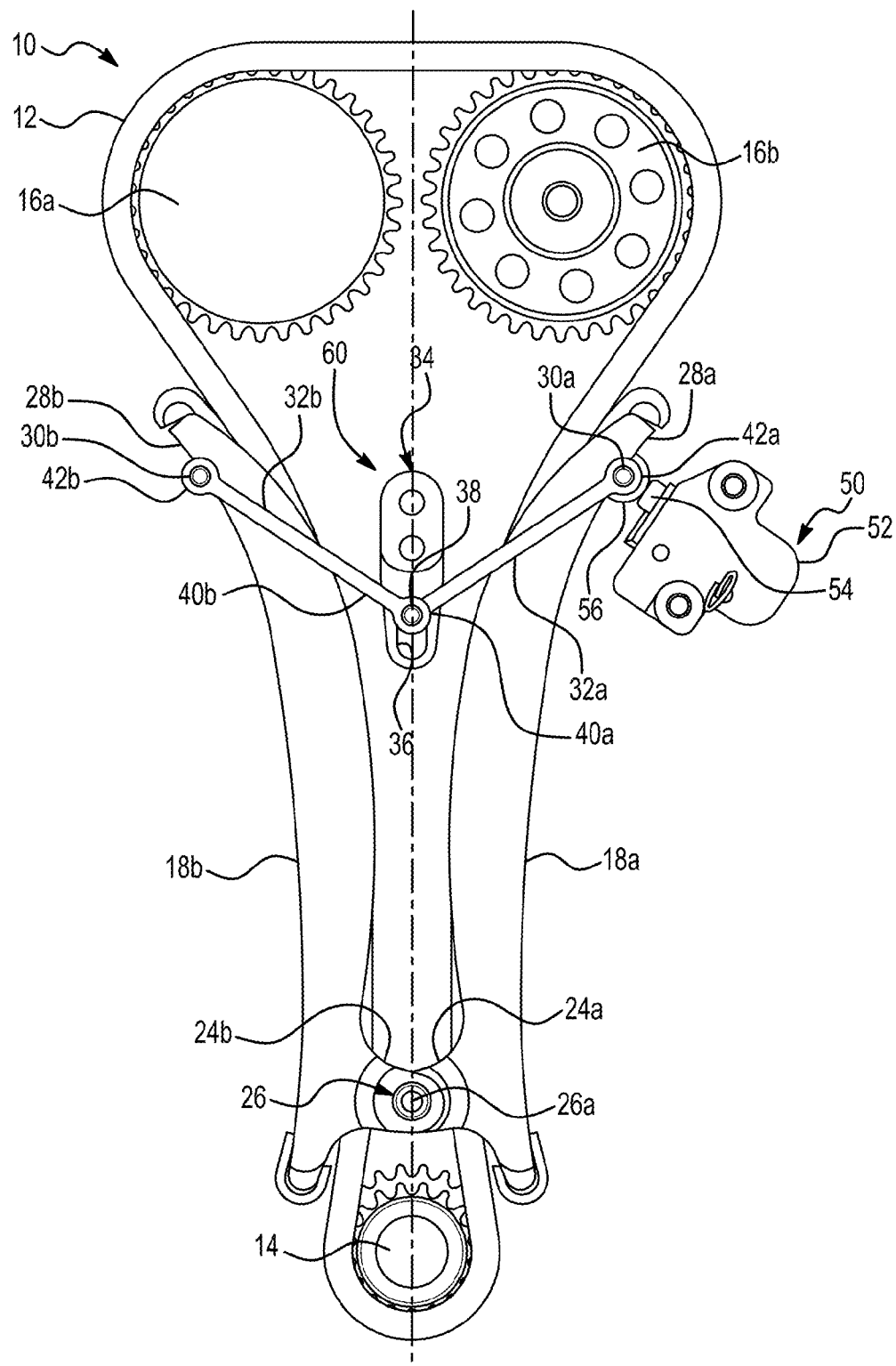
FIG. 4 is a front view of a timing system including a multi-strand tensioning arrangement having an endless loop of belt or chain, a drive sprocket, at least one driven sprocket, a tension driver mechanism acting indirectly on an arm, and an arm movement guide mechanism including a single fixed pivot pin configuration.
Figure 5:
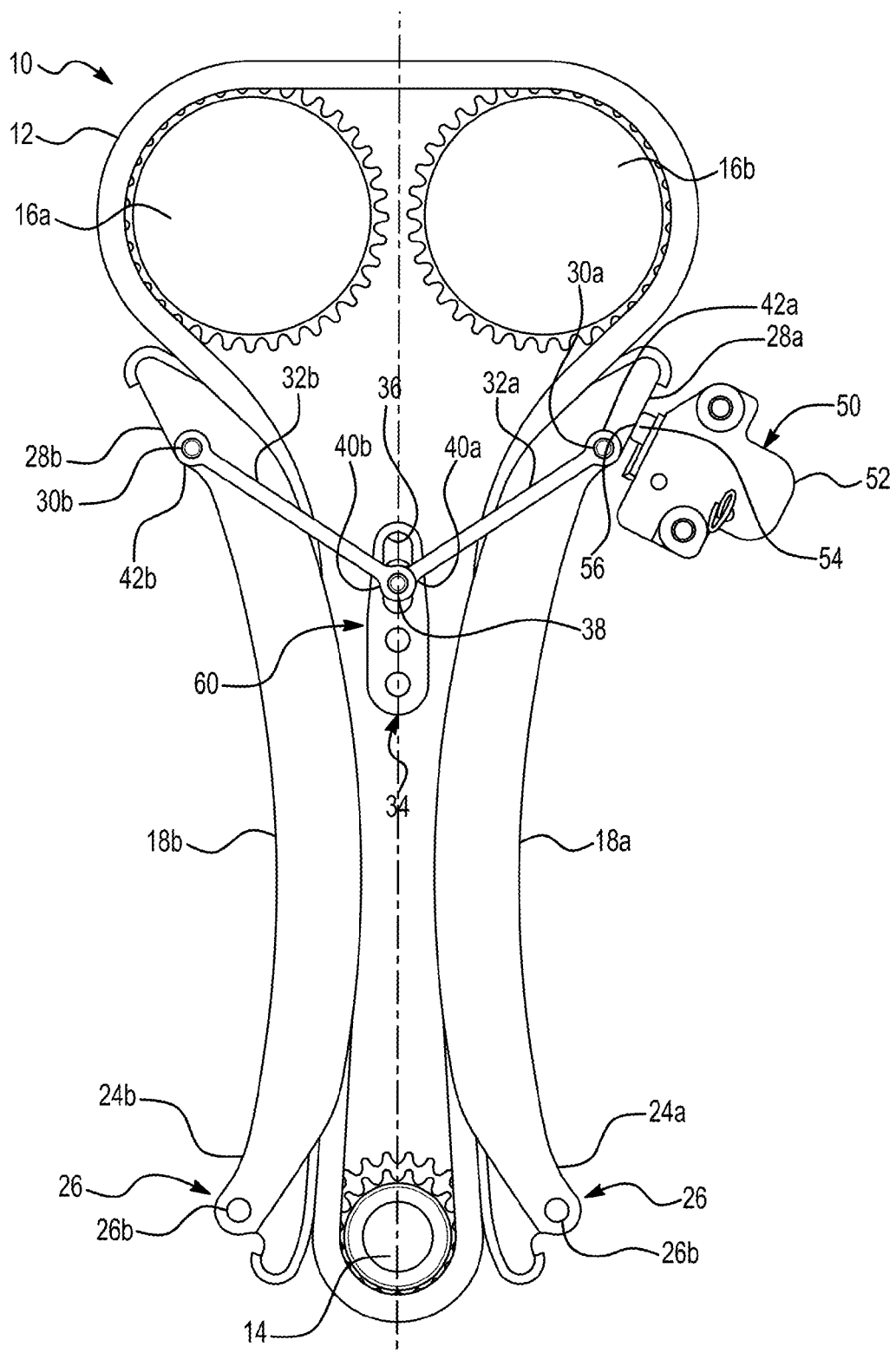
FIG. 5 is a front view of an a timing system including a multi-strand tensioning arrangement having an endless loop of belt or chain, a drive sprocket, at least one driven sprocket, a tension driver mechanism acting directly on an arm, and an arm movement guide mechanism including a dual fixed pivot pin configuration.
Figure 6:
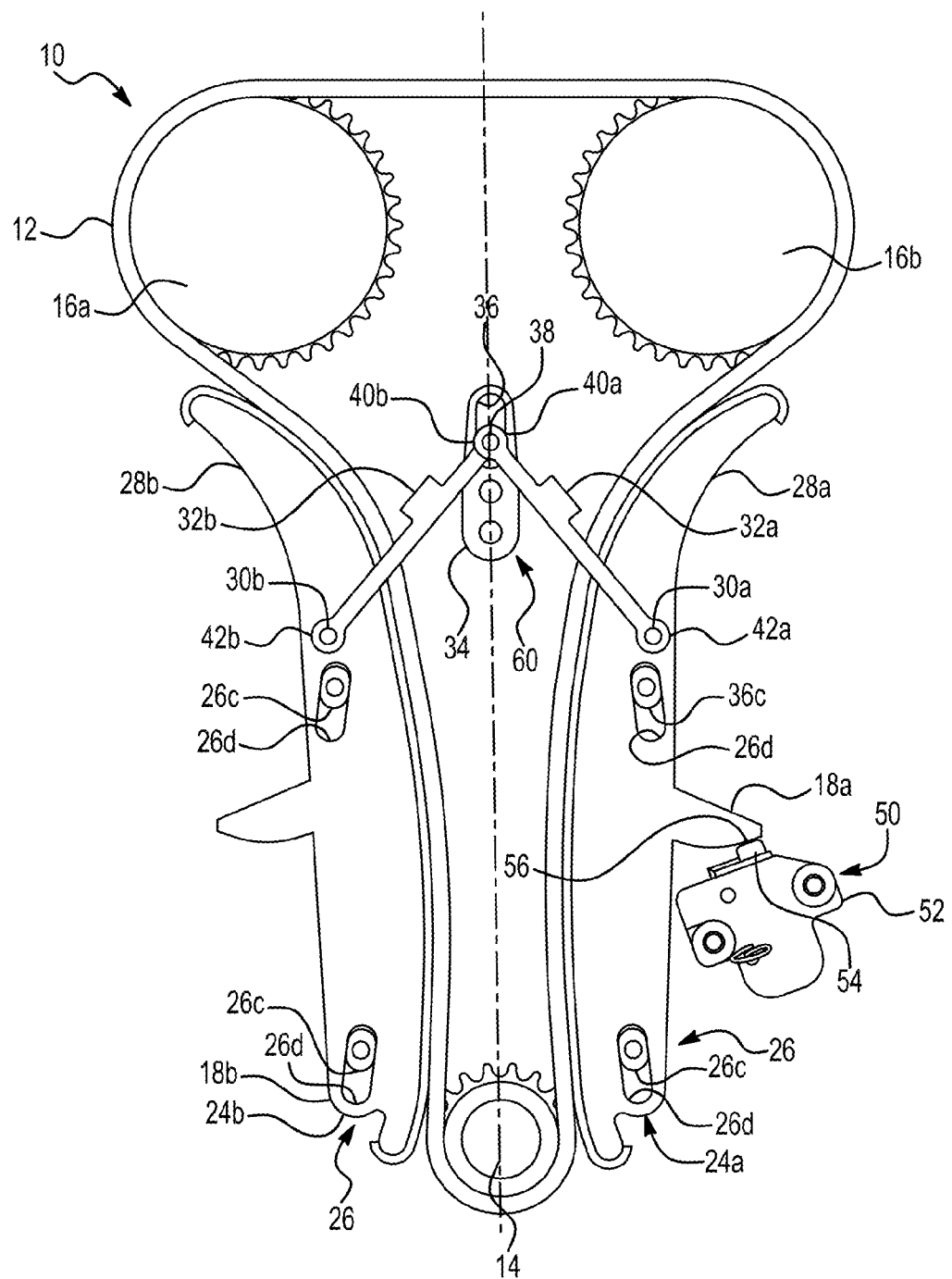
FIG. 6 is a front view of a timing system including a multi-strand tensioning arrangement having an endless loop of belt or chain, a drive sprocket, at least one driven sprocket, a tension driver mechanism acting directly on an arm, and an arm movement guide mechanism including a pin and slot combination defining a lost motion pivot pin configuration.

Each of the tensioning arms 18a, 18b has an arm movement guide mechanism 26, by way of example and not limitation, such as a pivoting end 24a, 24b for rotation about a fixed pin, which can be a common fixed pivot pin 26a as illustrated in FIGS. 1-4, or which can be dual fixed pins 26b as illustrated in FIG. 5, or slot and pin combinations 26c, 26d defining a lost motion pivot pin as illustrated in FIG. 6. Each of the tensioning arms 18a, 18b includes a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes 20a, 20b can be of any desired conventional configuration.

Inside the power transferring member strands, and preferably along a power transferring member centerline (i.e. a line spaced equidistant between the two strands of the power transferring member), is a rigidly fixed body 34 defining a slot 36 with outer ends extending generally between the drive sprocket 14 and at least one driven sprocket 16a, 16b. The fixed body 34 is located generally central to and inside of the endless loop power transferring member 12 as best seen in FIGS. 1-6. A free moving pin 38 is retained in the slot 36 and is pivotally constrained to the first end 40a of the elongate link member 32a and the first end 40b of the link member 32b, restricting the movement of both first ends 40a, 40b of the link members 32a, 32b to that defined by the slot 36.

As illustrated in FIGS. 1-2, the link end 28a of the first tensioning arm 18a is pivotally attached to a generally centrally located pivot position 42a of the elongate link member 32a. The pivoting end 24a, 24b of both tensioning arms 18a, 18b can be pivotally attached to an arm movement guide mechanism 26, such as a common fixed pivot pin 26a. The link end 28b of the second tensioning arm 18b is pivotally attached to the second end 42b of the link member 32b. The generally centrally located pivot position 42a can be approximately equidistant from the first end 40a and from a pad 44 located near an outer end 46 of the lever extension 48 of the elongate link member 32a.

The tension driver mechanism 50 can have a rigidly fixed housing 52 for receiving an outwardly spring biased piston 54 with an end 56 in contact with a pad 44 near the end 46 of the lever extension 48 of the elongate link member 32a. When the piston 54 of the tension driver mechanism 50 is biased outwards from the fixed housing 52, the end 56 of the piston 54 applies force to the pad 44 and a pivoting moment at the link end of the first arm 18a, forcing the first end 40a of the elongate link member 32a with a lever extension 48 to move within the slot 36 of the fixed body 34 while moving the first tensioning arm 18a toward the power transferring member centerline in a tensioning manner. Being that the first end 40b of the link member 32b is pivotally attached to the first end 40a of the elongate link member 32a with a lever extension 48, the link member 32b also must move in the slot 36 of the fixed body 34 and moves the second tensioning arm 18b toward the power transferring member centerline thereby tensioning the power transferring member 12 nearly simultaneously and nearly equally on both strands.

The first and second tensioning arms 18a, 18b can each have a pivot end 24a, 24b for rotation about a common fixed pivot pin 26a, a link end 28a, 28b for pivotally connecting to a link member 32a, 32b, and a shoe 20a, 20b with a face for sliding contact with a power transferring member 12. An elongate link member 32a is provided having a first end 40a for pivotally connecting to the first end 40b that is being constrained within a slot 36 of a fixed body 34 and a generally centrally located pivot position 42a for pivotally connecting to the link end 28a of a first tensioning arm 18a. The link member 32a with a lever extension 48 having a body of two lengths, each emanating from a pivot position 42a for pivotally attaching to the link end 28a of the first tensioning arm 18a. The first length having a first end 40a for pivotally connecting the first end 40b of at least one link member 32b that is being constrained within a slot 36 of a fixed body 34 by a freely movable pin 38. The second length or lever extension 48 having a pad 44 for contacting the piston 54 of the tension driver mechanism 50. The slot defining body 34 rigidly fixed to secure the slot 36 with outer ends pointing generally toward the sprockets 14, 16a, 16b and somewhat central to and inside the power transferring member 12.

A tension driver mechanism 50 can include a piston 54 biased outwardly from a fixed housing 52 by a spring, a pressurized fluid, or any combination thereof. A blade type spring can be applied within the tensioning arm 18a, 18b between the arm body and the shoe 20a, 20b to provide supplemental tensioning as needed. A continuous belt or chain 12 can encircle a drive pulley or sprocket 14 and at least one driven pulley or sprocket 16a, 16b. A drive pulley or sprocket 14 can fix one part of a path of the continuous endless loop power transferring member 12. At least one driven sprocket 16a, 16b can fix another part of the path of the continuous endless loop power transferring member 12.

The tension driver mechanism 50 is the source of force that causes the primary tensioning of the power transferring member 12. The tensioning force is applied to a pad 44 near the end 46 of the lever extension 48 of the elongate link member 32a. Any movement creates a pivoting motion at the link end 28a of the first tensioning arm 18a. This pivoting causes a slot-constrained pin 38 to freely move upward driving the first end 40a of the elongate link member 32a and an inward movement of the link end 28a of the first tensioning arm 18a. The slot-constrained pin 38 movement upward of the pinned first ends 40a, 40b causes an inward movement of the link end 28b of the second tensioning arm 18b. The inward movement of the link ends 28a, 28b of the first and the second tensioning arms 18a, 18b causes tensioning of the power transferring member 12. The slot body 34 limits the sidewise motion of the first ends 40a, 40b and the clocking of the driven sprockets 16a, 16b.

The lever extension 48 can increase or multiply the motion of the piston 54 of the tension driver mechanism to better insure pumping up of the hydraulic tensioner and allows location of the tension driver mechanism outside of the endless loop power transferring member 12. The tension driver mechanism force is applied to position the tensioning arm of one strand, preferentially with the other tensioning arm following. A spring loaded shoe 20a, 20b in the tensioning arm 18a, 18b can provide for localized strand tensioning, supplementing the limited tensioning arm 18a, 18b motion due to the two tensioning arms 18a, 18b being linked together, or for an intentionally softened tensioner spring. Spring loading of the tensioning shoe is optional, if desired.

The link members 32a with lever extension 48 and tension driver mechanism 50 can be located on an opposite side from that illustrated in FIGS. 1 and 2, i.e. these elements can swap sides in order to locate the tension driver mechanism on either the tight strand or the slack strand side. The tension driver mechanism 50 can be hydraulic with damping and a ratchet, or with just a spring (no hydraulics) and/or no ratchet. The arm movement guide mechanism 26 can include one common arm pivot pin 26a located near the drive sprocket inside the power transferring member loop as illustrated in FIGS. 1-4, or alternatively two individual arm pivot pins 26b can be located near the drive sprocket outside the power transferring member loop as illustrated in FIG. 5, or alternatively pin and slot combinations 26c, 26d defining a lost motion pivot pin as illustrated in FIG. 6. Additional driven sprockets to those illustrated in FIGS. 1-6 can also be added, if desired.

Alternatively, it should also be recognized that two individual arm pivot pins 26b can be located near the driven sprocket or sprockets outside the power transferring member loop, if desired. The tensioning arms 18a, 18b, link members 32a, 32b, slot defining fixed body 34, and tension driver mechanism 50 can be inverted so the pivoting ends 24a, 24b of the tensioning arms 18a, 18b are located near the cam or driven sprockets 16a, 16b. It should also be recognized that the blade type spring between the body of the tensioning arms 18a, 18b and the corresponding shoes 20a, 20b could be eliminated, eliminating the compliant face assembly. The multi-strand tensioning arrangement 10 can be used for any drive with a drive pulley or sprocket 14 and at least one driven pulley or sprocket 16a, 16b.

A power transmission system using such a multi-strand tensioning arrangement 10 can include a drive sprocket 14 and at least one driven sprocket 16a, 16b wrapped by a continuous power transferring member 12, by way of example and not limitation such as a chain or belt loop that is flanked by a pair of arms 18a, 18b having a shoe 20a, 20b with a wear surface facing inward toward the sprockets and in contact with the tight and slack strands of the power transferring member loop. Each arm 18a, 18b can have an arm movement guide mechanism 26, by way of example and not limitation such as an anchoring pivot 26a at one end, possibly common with the other arm but not necessarily so, and a link assembly for making a connection through link members 32a, 32b to one another. A tension driver mechanism 50 provides force to move one of the aims 18a, 18b, either directly or indirectly, while the other arm follows this movement through action of the link members 32a, 32b constrained movement with respect to pin 38 in slot 36 of fixed body 34. The slot defining body 34 can be rigidly fixed to secure the slot 36 with its ends pointing, generally toward the sprockets 14, 16a, 16b and with a centerline somewhat central to the inside of the power transferring member. The pin 38 is constrained to movement within the length of the slot 36, and is pivotally attached to the first end 40a of the link member 32a and to the first end 40b of the link piece 32b. A second end 42a of the elongate link member 32a is pivotally attached to the link end 28a of the first tensioning arm 18a that has the pivoting end 24a pivotally attached to a common fixed pin 26, positioned inside the loop of power transferring member 12 near the drive sprocket 14. The shoes 20a, 20b of the tensioning arms 18a, 18b are located outside the loop of power transferring member 12. The second tensioning aim 18b is pivotally attached at the pivoting end 24b to the common fixed pin 26a.

The elongate link member 32a with a lever extension 48 has a body of two lengths, each emanating outwardly a distance from a generally centrally located pivot position, either pivot position 42a for pivotally attaching to the link end 28a of the first tensioning arm 18a or pivot position 40a for pivotally attaching to the pin 38 constrained to movement within the slot 36 of the fixed body 34. The distance emanated from the centrally located pivot position 40a or 42a can be approximately equal between the first end 40a and the pad 44 adjacent the outer end 46 of the lever extension 48, or can be of unequal lengths if desired. If the centrally located pivot position is 42a as illustrated in FIGS. 1-2, the first end 40a of the elongate link member 18a with a lever extension 48 is pivotally connected to the pin 38 of the first end 40b of the at least one link member 32b and is also, as previously described, constrained to movement defined by the slot 36 in the slot defining body 34. If the centrally located pivot position is 40a as illustrated in FIG. 3, the second end 42a is pivotally attached to the link end 28a of the first tensioning arm 18a. The second end 42b of the at least one link member 32b is pivotally attached to the link end 28b of the second tensioning arm 18b.

A tension driver mechanism 50 can include a piston 54, biased outward by a spring force, from a fixed housing 52 located so that an end 56 of the piston 54 provides driving force to one of the tensioning arms 18a, 18b, while the other tensioning arm 18b, 18a follows in response to the assembly of link members 32a, 32b. If the piston 54 is acting indirectly on the tensioning arms 18a, 18b, such as illustrated in FIGS. 1-3, the end 56 can be in contact with the pad 44 of the outer end 46 of the lever extension 48 of the elongate lever member 32a for applying a tensioning force against the pad 44. Any movement of the pad 44 creates a pivoting motion at the link end 28a of the first tensioning arm 18a at the pivot position 40a or 42a. If the piston 54 is acting directly on one of the tensioning arms 18a, 18b, such as illustrated in FIGS. 4-6, the end 56 can be in direct contact with the tensioning arm 18a or 18b or a connecting member, such as pivot 42a as illustrated in FIG. 5, for applying tensioning force. In either case, the resulting slot-constrained pin 38 movement upward or downward of the pinned first end 40a, 40b causes an inward movement of the link ends 28a, 28b of both tensioning arms 18a, 18b, tensioning the strands of the endless loop of power transferring member 12.

The tension driver mechanism 50 can include an outwardly spring biased piston 54 extending outwardly from a rigidly fixed housing 52, drawing the tensioning arms 18a, 18b together towards the power transferring member centerline, tensioning or squeezing the power transferring member strands between the tensioning arms 18a, 18b equally and simultaneously. By linking the tensioning arms 18a, 18b together the vibrations of one power transferring member strand is linked to the other power transferring member strand and the vibrations are generally neutralized. By linking the tensioning arms 18a, 18b together to a single tension driver mechanism 50, the force is divided equally between both tensioning arms 18a, 18b when the strands are equal. Since the tensioning arms 18a, 18b are connected, if one strand of the power transferring member tightens, the other strand must slacken. The total tensioning force is applied to resist the tightening strand.

The multi-strand tensioning arrangement also allows for the additional tensioning necessary to tension a worn, elongated power transferring member 12. Since the tensioning arms 18a, 18b are connected and tensioning the power transferring member strand is equal and simultaneous between the two tensioning arms 18a, 18b, the increase in power transferring member length is equally absorbed in each power transferring member strand, maintaining the timed relationship of the drive sprocket 14 and driven sprockets 16a, 16b throughout the life of the power transferring member, eliminating the need to compensate for the change in sequential timing due to power transferring member elongation and enhancing the engine performance over its lifetime. To tension an elongated, worn power transferring member 12, the tension driver mechanism 50 can be activated to extend outwards from the rigidly fixed housing 52, causing the opposing tensioning arms 18a, 18b to be drawn further in toward the power transferring member centerline and the rigidly fixed body 34, squeezing or tensioning the slack and taut strand portions of the power transferring member simultaneously and nearly equally.

In the illustration of FIGS. 1-2, a rigidly fixed body 34 defining a slot 36 is provided, one link member 32a includes a lever extension 48 extending past a pivot position 42a providing a pad 44 outside the loop of power transferring member 12 allowing the tension driver mechanism to be moved outside the endless loop of power transferring member 12. The slot 36 in the slot body 34 constrains the first end or ends 40a, 40b of the link members 32a, 32b thereby restricting driven cam sprocket 16a, 16b clocking by restricting the unitized swing of the two tensioning arms 18a, 18b about respective or common pivot pin 26. The lever extension 48 and pad 44 can provide a moment arm nearly equal to a distance between the two pin locations 40a, 42a and can nearly double the motion of the pin 38 constrained to the slot 36 contributing to improved pump-up of the multi-strand tensioner arrangement 10. The illustrated configuration allows increased freedom in the selection of a location for the tension drive mechanism 50.

Referring now to FIG. 3, a multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe with a power-transferring-member-sliding surface extending along a significant length of the arm. Each shoe can be spring loaded with a blade type spring positioned within a pocket of the complaint face assembly, if desired. The spring can be located between the tensioning arm 18a, 18b and the corresponding shoe deforming the shoe away from the tensioning arm. Each of the tensioning arms 18a, 18b has an arm movement guide mechanism 26, by way of example and not limitation, such as a pivoting end 24a, 24b for rotation about a fixed pin, which can be a common fixed pivot pin 26a. Each of the tensioning arms 18a, 18b includes a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes can be of any desired conventional configuration. Inside the power transferring member strands, and preferably along a power transferring member centerline (i.e. a line spaced equidistant between the two strands of the power transferring member), is a rigidly fixed body 34 defining a slot 36 with outer ends extending generally between the drive sprocket 14 and at least one driven sprocket 16a, 16b. The fixed body 34 is located generally central to and inside of the endless loop power transferring member 12. A link assembly 60 includes a first link member 32a and a second link member 32b. A free moving pin 38 is retained in the slot 36 and is pivotally constrained to the generally centrally located pivot position 40a of the elongate link member 32a and the first end 40b of the link member 32b, restricting the movement of both 40a and 40b of the link members 32a, 32b to that defined by the slot 36 with slot-restrained free moving pin 38. The link end 28a of the first tensioning arm 18a is pivotally attached to a pivot position 42a of the elongate link member 32a. The pivoting end 24a, 24b of both tensioning arms 18a, 18b can be pivotally attached to an arm movement guide mechanism 26, such as a common fixed pivot pin 26a. The link end 28b of the second tensioning arm 18b is pivotally attached to the second end 42b of the link member 32b. The generally centrally located pivot position 40a can be approximately equidistant from the second end 42a and from a pad 44 located near an outer end 46 of the lever extension 48 of the elongate link member 32a. The tension driver mechanism 50 can have a rigidly fixed housing 52 for receiving an outwardly spring biased piston 54 with an end 56 in contact with a pad 44 near the end 46 of the lever extension 48 of the elongate link member 32a. When the piston 54 of the tension driver mechanism 50 is biased outwards from the fixed housing 52, the end 56 of the piston 54 applies force to the pad 44 and a pivoting moment at the link end of the tensioning arm 18a, forcing the pivot position 40a of the elongate link member 32a with a lever extension 48 to move within the slot 36 of the fixed body 34 while moving the first tensioning arm 18a toward the power transferring member centerline in a tensioning manner. Being that the first end 40b of the link member 32b is pivotally attached to the pivot position 40a of the elongate link member 32a with a lever extension 48, the link member 32b also must move in the slot 36 of the fixed body 34 and moves the second tensioning arm 18b toward the power transferring member centerline thereby tensioning the power transferring member 12 nearly simultaneously and nearly equally on both strands.

Referring now to FIG. 4, a multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe with a power-transferring-member-sliding surface extending along a significant length of the arm. Each shoe can be spring loaded with a blade type spring positioned within a pocket of the complaint face assembly, if desired. The spring can be located between the tensioning arm 18a, 18b and the corresponding shoe deforming the shoe away from the tensioning arm. Each of the tensioning arms 18a, 18b has an arm movement guide mechanism 26, by way of example and not limitation, such as a pivoting end 24a, 24b for rotation about a fixed pin, which can be a common fixed pivot pin 26a. Each of the tensioning arms 18a, 18b includes a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes can be of any desired conventional configuration. Inside the power transferring member strands, and preferably along a power transferring member centerline (i.e. a line spaced equidistant between the two strands of the power transferring member), is a rigidly fixed body 34 defining a slot 36 with outer ends extending generally between the drive sprocket 14 and at least one driven sprocket 16a, 16b. The fixed body 34 is located generally central to and inside of the endless loop power transferring member 12. A link assembly 60 includes a first link member 32a and a second link member 32b. A free moving pin 38 is retained in the slot 36 and is pivotally constrained to the first end 40a of the link member 32a and the first end 40b of the link member 32b, restricting the movement of both first ends 40a, 40b of the link members 32a, 32b to that defined by the slot 36 with slot-restrained free moving pin 38. The link end 28a of the first tensioning arm 18a is pivotally attached to a second end 42a of the link member 32a. The pivoting end 24a, 24b of both tensioning arms 18a, 18b can be pivotally attached to an arm movement guide mechanism 26, such as a common fixed pivot pin 26a. The link end 28b of the second tensioning arm 18b is pivotally attached to the second end 42b of the link member 32b. The tension driver mechanism 50 can have a rigidly fixed housing 52 for receiving an outwardly spring biased piston 54 with an end 56 in contact with one of the tensioning arms 18a, 18b. When the piston 54 of the tension driver mechanism 50 is biased outwards from the fixed housing 52, the end 56 of the piston 54 applies force, directly or indirectly, to one of the tensioning arms 18a, 18b. As illustrated in FIG. 4, by way of example and not limitation, the end 56 of the piston 54 engages the tensioning arm 18a adjacent the pin 30a providing pivoting moment at the link end of the tensioning arm 18a, forcing the pivot position 40a of the link member 32a to move within the slot 36 of the fixed body 34 while moving the first tensioning arm 18a toward the power transferring member centerline in a tensioning manner. Being that the first end 40b of the link member 32b is pivotally attached to the first end 40a of the link member 32a, the link member 32b also must move in the slot 36 of the fixed body 34 and moves the second tensioning arm 18b toward the power transferring member centerline thereby tensioning the power transferring member 12 nearly simultaneously and nearly equally on both strands.

Referring now to FIG. 5, a multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe with a power-transferring-member-sliding surface extending along a significant length of the arm. Each shoe can be spring loaded with a blade type spring positioned within a pocket of the complaint face assembly, if desired. The spring can be located between the tensioning arm 18a, 18b and the corresponding shoe deforming the shoe away from the tensioning arm. Each of the tensioning arms 18a, 18b has an arm movement guide mechanism 26, by way of example and not limitation, such as a pivoting end 24a, 24b for rotation about a fixed pin, which can be separate fixed pivot pins 26b for each tensioning arm 18a, 18b. Each of the tensioning arms 18a, 18b includes a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes can be of any desired conventional configuration. Inside the power transferring member strands, and preferably along a power transferring member centerline (i.e. a line spaced equidistant between the two strands of the power transferring member), is a rigidly fixed body 34 defining a slot 36 with outer ends extending generally between the drive sprocket 14 and at least one driven sprocket 16a, 16b. The fixed body 34 is located generally central to and inside of the endless loop power transferring member 12. A link assembly 60 includes a first link member 32a and a second link member 32b. A free moving pin 38 is retained in the slot 36 and is pivotally constrained to the first end 40a of the link member 32a and the first end 40b of the link member 32b, restricting the movement of both first ends 40a, 40b of the link members 32a, 32b to that defined by the slot 36 with slot-restrained free moving pin 38. The link end 28a of the first tensioning arm 18a is pivotally attached to a second end 42a of the link member 32a. The pivoting end 24a, 24b of both tensioning arms 18a, 18b can be pivotally attached to an arm movement guide mechanism 26, such as separate fixed pivot pins 26b. The link end 28b of the second tensioning arm 18b is pivotally attached to the second end 42b of the link member 32b. The tension driver mechanism 50 can have a rigidly fixed housing 52 for receiving an outwardly spring biased piston 54 with an end 56 in contact with one of the tensioning arms 18a, 18b. When the piston 54 of the tension driver mechanism 50 is biased outwards from the fixed housing 52, the end 56 of the piston 54 applies force, directly or indirectly, to one of the tensioning arms 18a, 18b. As illustrated in FIG. 5, by way of example and not limitation, the end 56 of the piston 54 engages the tensioning arm 18a adjacent the pin 30a providing pivoting moment at the link end of the tensioning arm 18a, forcing the pivot position 40a of the link member 32a to move within the slot 36 of the fixed body 34 while moving the first tensioning arm 18a toward the power transferring member centerline in a tensioning manner. Being that the first end 40b of the link member 32b is pivotally attached to the first end 40a of the link member 32a, the link member 32b also must move in the slot 36 of the fixed body 34 and moves the second tensioning arm 18b toward the power transferring member centerline thereby tensioning the power transferring member 12 nearly simultaneously and nearly equally on both strands.

Referring now to FIG. 6, a multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe with a power-transferring-member-sliding surface extending along a significant length of the arm. Each shoe can be spring loaded with a blade type spring positioned within a pocket of the complaint face assembly, if desired. The spring can be located between the tensioning arm 18a, 18b and the corresponding shoe deforming the shoe away from the tensioning arm. Each of the tensioning arms 18a, 18b has an arm movement guide mechanism 26, by way of example and not limitation, such as a pivoting end 24a, 24b for movement about a fixed pin, which can be a fixed pin 26c and slot 26d combination defining a lost motion pivot mechanism for movement of each tensioning arm 18a, 18b along a predetermined path of travel. Each of the tensioning arms 18a, 18b includes a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes can be of any desired conventional configuration. Inside the power transferring member strands, and preferably along a power transferring member centerline (i.e. a line spaced equidistant between the two strands of the power transferring member), is a rigidly fixed body 34 defining a slot 36 with outer ends extending generally between the drive sprocket 14 and at least one driven sprocket 16a, 16b. The fixed body 34 is located generally central to and inside of the endless loop power transferring member 12. A link assembly 60 includes a first link member 32a and a second link member 32b. A free moving pin 38 is retained in the slot 36 and is pivotally constrained to the first end 40a of the link member 32a and the first end 40b of the link member 32b, restricting the movement of both first ends 40a, 40b of the link members 32a, 32b to that defined by the slot 36 with slot-restrained free moving pin 38. The link end 28a of the first tensioning arm 18a is pivotally attached to a second end 42a of the link member 32a. The pivoting end 24a, 24b of both tensioning arms 18a, 18b can be pivotally attached to an aim movement guide mechanism 26, such as a fixed pins 26c and slot 26d combination defining a lost motion movement mechanism. The link end 28b of the second tensioning arm 18b is pivotally attached to the second end 42b of the link member 32b. The tension driver mechanism 50 can have a rigidly fixed housing 52 for receiving an outwardly spring biased piston 54 with an end 56 in contact with one of the tensioning arms 18a, 18b. When the piston 54 of the tension driver mechanism 50 is biased outwards from the fixed housing 52, the end 56 of the piston 54 applies force, directly or indirectly, to one of the tensioning arms 18a, 18b. As illustrated in FIG. 6, by way of example and not limitation, the end 56 of the piston 54 engages the tensioning arm 18a on an outwardly extending protrusion of the tensioning arm 18a providing moment of the tensioning arm 18a, forcing the pivot position 40a of the link member 32a to move within the slot 36 of the fixed body 34 while moving the first tensioning arm 18a toward the power transferring member centerline in a tensioning manner. Being that the first end 40b of the link member 32b is pivotally attached to the first end 40a of the link member 32a, the link member 32b also must move in the slot 36 of the fixed body 34 and moves the second tensioning arm 18b toward the power transferring member centerline thereby tensioning the power transferring member 12 nearly simultaneously and nearly equally on both strands.

In summary, an apparatus 10 imparts tension to multiple strands of a power transferring member 12 forming an endless loop to conform to a radius of curvature of spaced apart devices 14, 16a, 16b rotatable about respective spaced apart axes. Each device 14, 16a, 16b has a drive face radially spaced from the respective spaced apart axes of rotation for intended power transferring engagement of the power transferring member 12 between the spaced apart devices 14, 16a, 16b. The apparatus includes two tensioning aims 18a, 18b spaced apart from one another at respective outer ends 28a, 28b for pivoting movement independent of one another. The two tensioning arms 18a, 18b support inwardly facing shoes 20a, 20b with power-transferring-member-sliding faces 22a, 22b. A link assembly 60 includes at least two link members 32a, 32b pivotally connected to one another at respective first ends 40a, 40b with slot-restrained free moving pin 38. The connected first ends 40a, 40b are constrained for limited movement along a fixed slot 36 extending generally along a centerline of the endless loop 12 between the spaced apart devices 14, 16a, 16b. The at least two link members 32a, 32b are pivotally connected individually to outer ends 28a, 28b of opposite ones of the two spaced apart tensioning arms 18a, 18b at second locations 42a, 42b spaced from the first ends 40a, 40b. One of the two link members 32a, 32b can include a lever extension 48 extending outwardly from one of the pivot locations 40a or 42a to be engageable with a tension driver 50 for driving the link assembly 60 and connected tensioning arms 18a, 18b in motion for tensioning the power transferring member 12 nearly simultaneously and nearly equally on both strands.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tensioning system for imparting tension to an endless loop power transferring member encircling a drive sprocket and at least one driven sprocket comprising:
    a pair of tensioning arms, each tensioning arm having an arm movement guide mechanism, a link pivot and a shoe with a power-transferring-member-sliding face;
    at least two link members, each link member having a first end and a second end, each second end connected to corresponding link pivots of the pair of tensioning arms;
    a rigidly fixed body defining a slot with outer ends extending generally between the drive sprocket and at least one driven sprocket, the fixed body located inside of the endless loop power transferring member;
    a free moving pin retained in the slot of the fixed body and pivotally constrained to each first end of the corresponding link members for limiting motion of each first end to be defined by the slot; and
    a tension driver for driving the pair of tensioning arms relative to one another.

2. The tensioning system of claim 1 further comprising:
    one of the link members defining an elongate link member having a lever extension extending outwardly from one of the first end and the second end for engagement with the tension driver.

3. The tensioning system of claim 2, wherein the lever extension and tension driver are located outside the endless loop power transferring member.

4. The tensioning system of claim 2, wherein the lever extension extends a distance from the second end nearly equidistant with respect to a distance from the second end to the first end of the elongate link member.

5. The tensioning system of claim 2, wherein the lever extension provides a moment arm nearly equal to a distance between the first end and the second end and nearly doubles a motion of the pin constrained to the slot contributing to improved performance.

6. The tensioning system of claim 1, wherein the arm movement guide mechanism for each tensioning arm further comprises:
    a common fixed pivot pin connected to the pivot of each tensioning arm located inside the endless loop power transferring member.

7. The tensioning system of claim 1, wherein the arm movement guide mechanism for each tensioning arm further comprises:
    a separate fixed pivot pin connected to the pivot of each tensioning arm located outside the endless loop power transferring member.

8. The tensioning system of claim 1, wherein the arm movement guide mechanism for each tensioning arm further comprises:
    a pin and slot combination connected to each of the tensioning arms located outside the endless loop power transferring member.

9. The tensioning system of claim 1, wherein the slot-restrained free moving pin and link members restrict driven sprocket clocking by restricting unitized swinging movement of the pair of tensioning arms about the arm movement guide mechanism.

10. An apparatus for imparting tension to multiple strands of a power transferring member forming an endless loop to conform to a radius of curvature of spaced apart devices rotatable about respective spaced apart axes of rotation, and each device having a drive face radially spaced from an axis of rotation for intended power transferring engagement of the power transferring member forming the endless loop between the spaced apart devices, the apparatus comprising:
    two tensioning arms spaced apart from one another at respective outer ends for guided movement independent of one another, the two tensioning arms supporting inwardly facing shoes with power-transferring-member-sliding faces;
    a link assembly including at least two link members pivotally connected to one another at respective first ends and pivotally connected individually to outer ends of opposite ones of the two spaced apart tensioning arms at second locations spaced from the first ends; and
    a free moving pin and slot combination located inside of the endless loop of the power transferring member for constraining movement of respective connected first ends of the corresponding link members to be defined by the slot.

11. The apparatus of claim 10 further comprising:
    an arm movement guide mechanism having at least one fixed pivot pin for supporting the two tensioning arms for independent movement with respect to one another.

12. The apparatus of claim 11, wherein the arm movement guide mechanism for each tensioning arm further comprises:
    a pair of pin and slot combinations connected to each of the tensioning arms located outside the power transferring member forming an endless loop for guiding movement of each tensioning arm along a predetermined path of travel.

13. The apparatus of claim 10 further comprising:
    a tension driver located outside of the endless loop and having a rigidly fixed housing supporting a spring biased piston within the housing with an outer end engageable with one of the tensioning arms.

14. The apparatus of claim 10 further comprising:
    one of the two link members including a lever extension extending outwardly for driving the link assembly and connected tensioning arms in motion for tensioning the endless loop of the power transferring member nearly simultaneously and nearly equally on both strands; and
    a tension driver located outside of the endless loop and having a rigidly fixed housing supporting a spring biased piston within the housing with an outer end engageable with the lever extension.

15. The apparatus of claim 14, wherein the lever extension extends a distance from the second location nearly equidistant with respect to a distance from the second location to the first end of the link member.

16. The apparatus of claim 14, wherein the lever extension provides a moment arm nearly equal to a distance between the first end and the second location and nearly doubles a motion of the slot-restrained first ends of the link members contributing to improved performance.

17. The apparatus of claim 10, wherein force applied to the link assembly positions a tensioning arm of one strand preferentially, with another tensioning arm following.

18. The apparatus of claim 10, wherein the slot-restrained connected first ends of the link members restrict device clocking by restricting unitized pivoting movement of the two tensioning arms.

19. In an apparatus for imparting tension to multiple strands of a power transferring member forming an endless loop to conform to a radius of curvature of spaced apart devices rotatable about respective spaced apart axes of rotation, and each device having a drive face radially spaced from an axis of rotation for intended power transferring engagement of the power transferring member forming the endless loop between the spaced apart devices, two tensioning arms spaced apart from one another at respective outer ends and pivotally connected to one another at inner ends for independent rotation about a common fixed pin, the two tensioning arms supporting inwardly facing shoes with power-transferring-member-sliding faces, the improvement comprising:

- a link assembly including two link members pivotally connected to one another at respective first ends, the connected first ends constrained for limited movement along a fixed slot extending generally along a centerline of the endless loop between the spaced apart devices, the two link members pivotally connected individually to outer ends of opposite ones of the two spaced apart tensioning arms at second locations spaced from the first ends; and
- a tension driver for driving the link assembly and connected tensioning arms in motion for tensioning the power transferring member forming the endless loop nearly simultaneously and nearly equally on both strands.

\* \* \* \* \*